W. M. GORDON.
CHERRY CLIPPER.
APPLICATION FILED APR. 21, 1913. RENEWED JULY 9, 1914.
1,108,572. Patented Aug. 25, 1914.
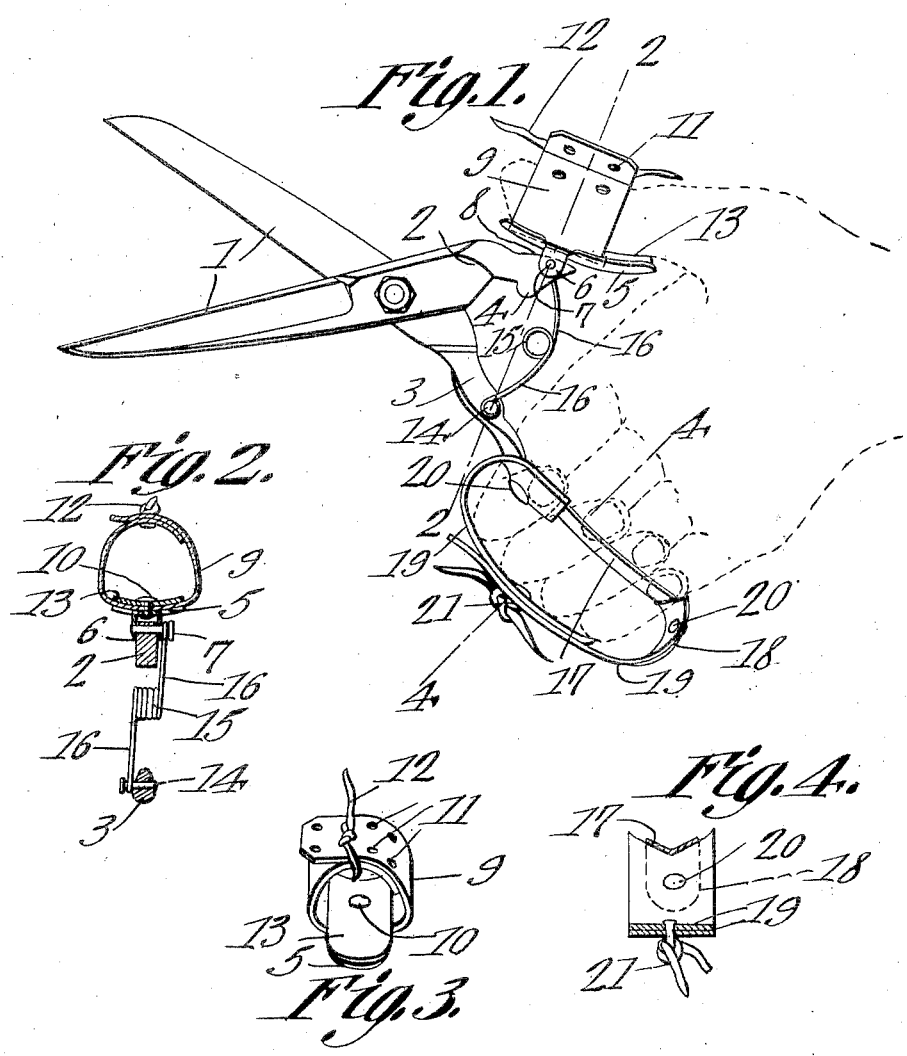
Witnesses
W. M. Gordon
Inventor
by C. A. Snow & Co.
Attorneys

UNITED STATES PATENT OFFICE.

WILBUR M. GORDON, OF TRAVERSE CITY, MICHIGAN.

CHERRY-CLIPPER.

1,108,572.   Specification of Letters Patent.   Patented Aug. 25, 1914.

Application filed April 21, 1913, Serial No. 762,681. Renewed July 9, 1914. Serial No. 850,053.

*To all whom it may concern:*

Be it known that I, WILBUR M. GORDON, a citizen of the United States, residing at Traverse City, in the county of Grand Traverse and State of Michigan, have invented a new and useful Cherry-Clipper, of which the following is a specification.

The present invention appertains to a cherry or fruit clipper, and aims to provide a device of that character so designed and constructed to meet the demands of those engaged in the occupation of picking or clipping cherries.

It is the prevailing custom at the present time to employ an ordinary pair of shears or scissors for clipping cherries, but the use of such an implement is found of disadvantage for a number of reasons. Thus, an ordinary pair of scissors or shears in being employed for this purpose soon become gummed in cutting the stems of the cherries, and as a result, the cutters will tend to stick and work with extreme difficulty, so that a constant effort on the part of the operator is necessary to open the cutters, which soon causes the back of the thumb and fingers to become calloused and sore. Another objection to the employment of such a shears or scissors is the fact that the same may not be easily operated, it being necessary to so open and close the hand as to consume considerable time as well as energy. Other disadvantages are also incident to the use of a pair of shears and scissors for this purpose, as will be apparent.

With the numerous disadvantages in view in the use of an ordinary pair of scissors or shears, it has been the object of the present invention to provide a novel and improved clipper designed and constructed especially to meet the need of those engaged in clipping cherries, and which shall be convenient, serviceable and efficient in its use, as well as simple, durable and inexpensive in construction.

With the foregoing general object outlined and with other objects in view, which will be apparent as the nature of the invention is better understood, the present invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention has been illustrated in its preferred embodiment in the accompanying drawing, wherein:—Figure 1 is a side elevation of the improved cherry clipper, showing the hand applied thereto in dotted lines. Fig. 2 is a sectional view taken on the line 2—2 of Fig. 1. Fig. 3 is a perspective detail of the thumb piece or seat. Fig. 4 is a sectional detail taken on the line 4—4 of Fig. 1.

In carrying out the invention, reference being had in detail to the drawing, there is provided a pair of crossed and pivoted blades or cutters 1 having the shanks 2 and 3, respectively, at their inner ends. The shank 2 is preferably provided with an inner lug or stop 4 adapted to engage or contact with the shank 3 so as to limit the closing movements of the blades or cutters. To the shank 2 there is attached a peculiar thumb piece 5, the shank being relatively short and the thumb piece 5 being stamped or pressed from sheet metal or similar stock. The thumb piece 5 is preferably concaved laterally and longitudinally slightly so as to conform to the face of the first thumb phalanx, and a pair of ears 6 are struck downwardly from the edges of the thumb piece 5 at a point slightly forward of its center. The ears 6 overlap the shank 2 and are pivoted to the shank by means of a pin or rivet 7 engaged through the ears and shank, the edge of the shank 2 between the pin 7 and thumb piece 5 being curved, as at 8, so as to limit the forward and rearward swinging movements of the thumb piece.

A strap 9 is secured at an intermediate point on the thumb piece or seat 5 by means of a rivet or other securing member 10, which is disposed between the ears 6, and the ends of the strap 9 are provided with a plurality of pairs of apertures or eyelets 11 through which a lacing 12 is adapted to be threaded for adjustably connecting the ends of strap. The strap 9 is preferably constructed of soft leather or similar material, and is relatively wide so as to comfortably embrace the first thumb phalanx to hold it snugly in position of the thumb piece or seat 5. A pad 13 of leather or other soft material is disposed on and covers the thumb piece 5, and is preferably of similar outline or contour, the pad 13 passing over the intermediate portion of the strap 9 and being engaged by the rivet or securing member 10. This pad 13 serves as a soft bearing surface or facing for the thumb, as will be apparent.

A pin or rivet 14 is engaged through the shank 3 at a point spaced from a pivotal point of the blades similar to the pin or rivet 7, and a coiled wire spring 15 is disposed between the shanks 2 and 3, and has its ends 16 extending approximately radially or away from its axis. The terminals of the spring 15 are bent into eyes embracing opposite ends of the pins 7 and 14.

The shank 3 is extended into a relatively long and straight finger piece 17 of V-shaped cross section and which has its outer or free end curved back slightly as at 18. A pair of straps 19 of leather or other suitable material have their remote ends bent back and secured to the inner and outer ends of the finger piece 17, by means of rivets or other securing members 20. The other or free ends of the straps 19 are adapted to overlap and are provided with apertures or eyelets, similar to the strap 9, for the passage or engagement of a lacing 21.

In applying the hand to the clipper, the fingers are engaged over the finger piece 17, and the free ends of the straps 19 are so attached to each other as to comfortably hug or embrace the fingers. The first thumb phalanx is then placed on the finger piece or seat 5, the ends of the strap 9 having been so attached that the strap will comfortably hug or embrace the first thumb phalanx. With the fingers and thumb thus in position, the clipper is ready for use.

In using the clipper for severing the stems of cherries, it is desirable to move the thumb only, so that the limited movements of the thumb will swing the respective blade or cutter 1 to and from the other cutter or blade, it being noted that the shank 2 is relatively short, so that only the slight movement of the thumb is necessary and which will provide for the rapid operation of the clipper without appreciable effort on the part of the operator. The straps 19 in snugly embracing the fingers will hold the fingers firmly against the relatively straight finger piece 17, and as a consequence, the respective blade or cutter will be held stationary relative to the hand, the hand being held stationary so that the thumb-actuated blade or cutter only is operated or actuated. In this manner, by moving the hand, the respective blade or cutter may be directed properly over one side of the cherry stems, while the other blade or cutter may be operated by the thumb to sever the stems. The thumb in thus operating the blade or cutter will provide for a marked increase in speed as well as relieving the entire hand of exertion, other than the movement of the thumb. The pivoted thumb piece 5 permits the thumb to readily operate the blade or cutter irrespective of the particular angle of the thumb relative to the shank 2, the pressure of the thumb being applied through the medium of the pivot pin 7 to the shank 2 at all times so as to provide a uniform leverage. The pivotal connection of the thumb piece 5 with the shank 2 also assists in opening the blades or cutters when the thumb is moved outwardly, this being desirable should it be necessary to eliminate the spring 16. It will be noted that when the blades are closed or swung together, the spring 16 will be forced backwardly or toward the palm of the hand, the ends 16 being swung toward each other, so as to increase the tension or torsional strain of the spring 16, which will counteract the sticking action should the blades become gummed. The spring operates efficiently to open or spread the blades, the ends of the spring being in pivotal relation with the shanks.

The first thumb phalanx being seated on the pad 13 and being embraced by the strap 9 will be comfortably held in engagement with the thumb piece 5 so as not to become calloused, chafed or otherwise injured in the use of the clipper, it being noted that the strap 9 is adjustable to accommodate various sizes of thumbs. The straps 19 embracing the fingers also hold the fingers snugly in position, so as to eliminate callousing, chafing or the like.

With the present clipper, the blades may be quickly and efficiently operated by the least possible effort, it being desirable to move the thumb only, the thumb piece 5 moving with the thumb so that it will accommodate the hand in all of the steps or stages in the operation of the device. It is also possible with the present clipper, to hold the clipper in a horizontal position with the back of the hand uppermost, so that the cherry stems may be most effectively severed with ease and despatch. The padding 13 not only serves as a cushion for the thumb, but will prevent the strap 9 from pulling out of engagement with the rivet or securing member 10, as will be apparent.

From the foregoing taken in connection with the drawing, the advantages and capabilities of the device will be apparent to those versed in the art, it being noted that the present device carries out the objects aimed at in a satisfactory manner, and provides a highly desirable implement of the nature and for the purpose described.

The blade to which the thumb piece is attached is provided with a relatively wide bevel to provide a cutting or shearing edge which will be particularly adapted for cutting the cherry stems or fibrous substances.

Having thus described the invention, what is claimed as new is:—

In a cherry clipper, a pair of crossed and pivoted blades, one blade having a relatively short shank, the other blade having a shank extended into a relatively long member over which the four fingers of the operator's hand may be placed, a thumb piece pivoted to the short shank, a transverse strap having its intermediate portion secured on the thumb piece, a pair of straps having their remote ends turned back and secured to the end portions of the said relatively long member, means for adjustably connecting the end portions of the first mentioned strap to cause the strap to snugly embrace the thumb, and means for adjustably connecting the adjoining ends of the last mentioned straps whereby the said straps may snugly embrace the fingers.

In testimony that I claim the foregoing as my own, I have hereto affixed my signature in the presence of two witnesses.

WILBUR M. GORDON.

Witnesses:
E. P. ALLEN,
RALPH VISKOCHIL.